United States Patent [19]
Laurenzi

[11] Patent Number: 5,996,983
[45] Date of Patent: Dec. 7, 1999

[54] CUTTING OR COLLECTION BOARD WITH WASTE CONTAINER FOR EDGE AREA OF WORK SURFACE

[76] Inventor: Richard Laurenzi, 278 Sterling Pl., Brooklyn, N.Y. 11238

[21] Appl. No.: 09/146,787

[22] Filed: Sep. 3, 1998

Related U.S. Application Data

[60] Provisional application No. 60/083,457, Apr. 29, 1998.
[51] Int. Cl.[6] ....................................................... B23Q 3/00
[52] U.S. Cl. ........................................ 269/15; 269/289 R
[58] Field of Search .................................. 269/15, 302.1, 269/901, 289 R; 16/262, 331, 332

[56] References Cited

U.S. PATENT DOCUMENTS

| | | | |
|---|---|---|---|
| 331,029 | 11/1885 | Black | 269/302.1 |
| 2,751,951 | 6/1956 | Strathaus | 269/15 |
| 5,259,019 | 11/1993 | Stilley | 16/331 |
| 5,386,978 | 2/1995 | Ladwig | 269/289 R |

*Primary Examiner*—Timothy V. Eley
*Assistant Examiner*—Benjamin Halpern
*Attorney, Agent, or Firm*—Notaro & Michalos P.C.

[57] ABSTRACT

A board and waste container arrangement for a work surface having an edge includes a waste container having an open top, side walls and a bottom defining a waste receptacle for placement next to the edge of a work surface in a use position for the container. A board member having a bottom for placement on the work surface near the edge of the work surface in a use position for the board member, having a top and a discharge side. The discharge side of the board member is placed over and along the edge of the work surface when the board is in the use position. A pivot structure, such as a pair of ears extending from opposite ends of the discharge side of the board member, connects the board member to the container for pivotally mounting the container to the board member adjacent the discharge so that the container hangs over the edge of the work surface in the use positions of the container and the board member, with one side wall of the container being nearest the discharge side of the board member. The pivot structure, the container and the board member are arranged so that the container has a storage position with the one side wall of the container lying along and near the bottom of the board member. The container can be stored with its open top down, and with the board member extending upwardly along the side wall of the container.

14 Claims, 4 Drawing Sheets

CUTTING OR COLLECTION BOARD WITH WASTE CONTAINER FOR EDGE AREA OF WORK SURFACE

CROSS REFERENCE TO RELATED APPLICATION

This application claims the benefit of U.S. Provisional Application 60/083,457, filed Apr. 29, 1998, which is incorporated here by reference.

FIELD AND BACKGROUND OF THE INVENTION

The present invention relates in general to tools for kitchen and workshop areas, and in particular to a new and useful board for a work surface which is connected to a waste container or basket that hangs from the edge of the work surface for collecting waste.

U.S. Design Patent Des. 377,252 discloses a design by the present inventor for a counter top waste disposal unit. Although this unit has a waste container meant to hang from the edge of a work surface, it has no board member and is otherwise complicated in design and construction.

U.S. Pat. No. 4,273,318 discloses a food preparation appliance which combines a chopping board with a tray for collecting particles from the board. Magnets are used to link the tray to the board.

U.S. Design Patent Des. 317,551 discloses a combination knife rack and cutting board with drain.

U.S. Design Patent Des. 315,082 discloses a cutting board receptacle support.

A need remains for a simple, yet effective mechanism for hanging a container from the edge of a work space which combines with that container a board that can be used either for collection of waste, or as a cutting or chopping board, and at the work surface or counter top level.

SUMMARY OF THE INVENTION

An object of the present invention is to provide a board and waste container arrangement for a work surface having an edge, the arrangement comprising: a waste container having an open top, side walls and a bottom defining a waste receptacle for placement next to the edge of a work surface in a use position for the container; a board member having a bottom for placement on the work surface near the edge of the work surface in a use position for the board member, the board member having a top and a discharge side, the discharge side of the board member being placed over and along the edge of the work surface when the board member is in the use position; and pivot or engagement means between the board member and the container for mounting the container to the board member adjacent the discharge side of the board member so that the container hangs over the edge of the work surface in the use positions of the container and the board member, one side wall of the container being nearest to the discharge side of the board member. The pivot means, the container and the board member are structured so that the container has a storage position with the one side wall of the container lying along and near the bottom of the board member.

A further object of the present invention is to provide such an arrangement where the board member is a cutting board with a cutting surface, pads or feet for firmly engaging the work surface, with a groove around the perimeter of the cutting surface to help channel liquids into the container in the use positions of the board member and container.

A still further object of the present invention is to provide such an arrangement where the board member is a collecting board having raised sides and a front side opposite the side that is nearest the container, for use in collecting and channeling waste toward the container in the use positions of the board member and container.

Advantageously, the container hangs at about a right angle to the board member so that waste from the board member can be pushed directly into the container.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
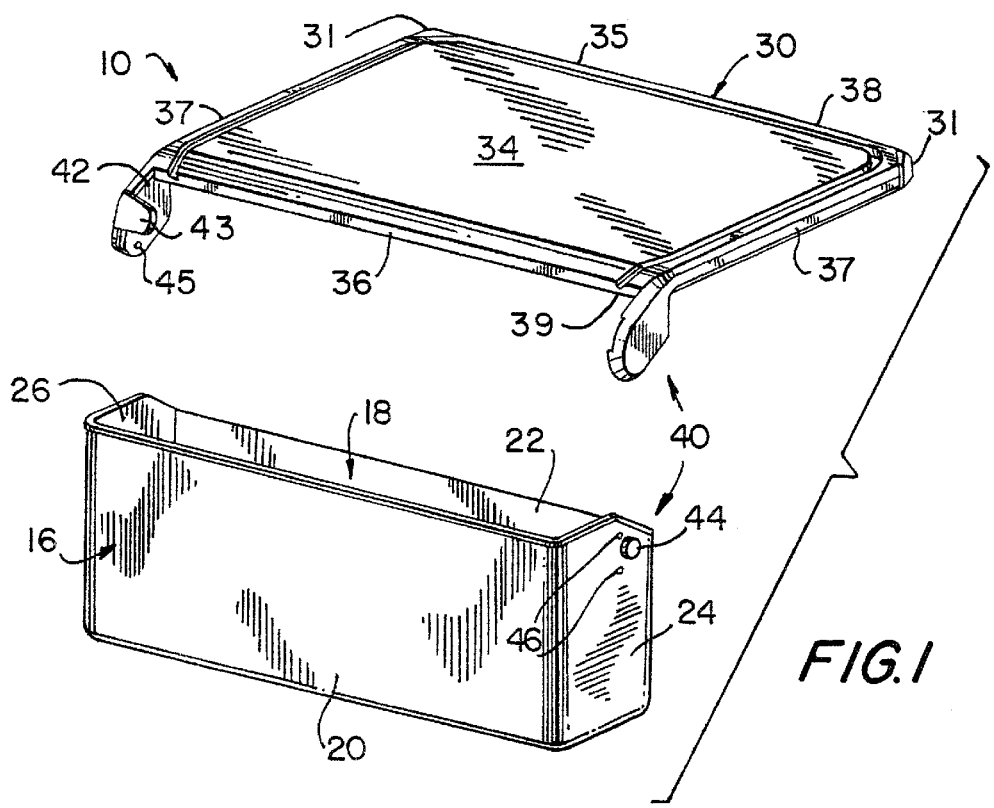
FIG. 1 is an exploded perspective view of a first embodiment of the invention.
Figure 2:
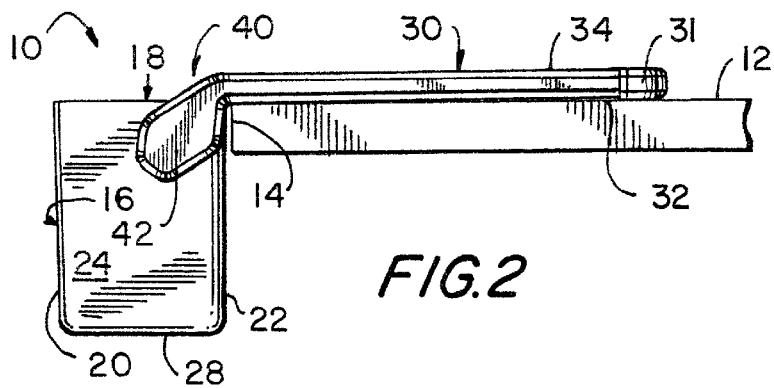
FIG. 2 is a side elevational view thereof in a use position on a work surface.

Referring to the drawings in particular, the invention embodied in FIGS. 1 and 2 comprises a board and waste container arrangement generally designated 10, for a work surface 12 having an edge 14. The arrangement includes a waste container generally designated 16, having an open top 18, side walls 20, 22, 24 and 26, and a bottom 28, together defining a waste receptacle for placement next to the edge 14 of a work surface 12 in a use position for the container as shown in FIG. 2. A board member generally designated 30, having a bottom 32 for placement on the work surface 12 near the edge 14 of the work surface in a use position for the board member which is also shown in FIG. 2, having a top 34 and a discharge side 36. The discharge side 36 of the board member 30 is placed over and along the edge 14 of the work surface 12 when the board is in the use position.

A pivot means or structure generally designated 40, such as a pair of ears 42 extending from opposite ends of the discharge side of the board member which engage a pair of trunnions 44 on the container 16, connects the board member 30 to the container for pivotally mounting the container to the board member adjacent the discharge side so that the container hangs over the edge of the work surface in the use positions of the container and the board member. In this position, one side wall 22 of the container 16 is nearest the discharge side 36 of the board member 30.

Figure 3:
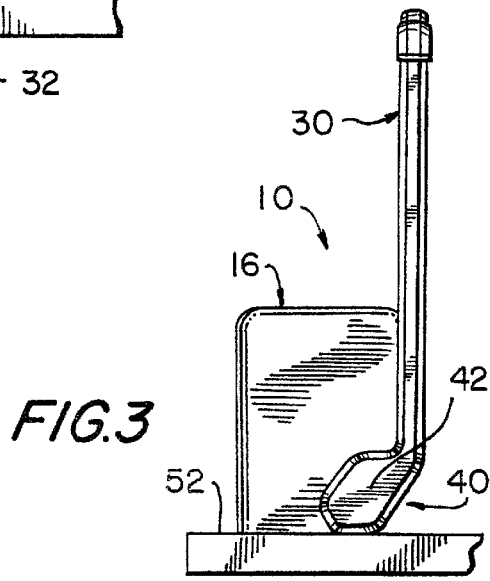
FIG. 3 is a side elevational view thereof in a storage position.

The pivot means 40, the container 16 and the board member 30 are arranged so that the container can pivot into a storage position illustrated in FIG. 3, with the one side wall 22 of the container lying along and near the bottom 32 of the board member. The container can, thus, be stored on a storage surface 52 with its open top 18 down on the storage surface, and with the board member extending upwardly along the side wall of the container.

A preferred form of the pivot means 40, as shown in FIG. 1, is to extend ears 42 from the opposite ends of the discharge side 32, substantially parallel to opposite sides 37 of the board member 30 and somewhat downwardly with respect to the work surface as shown in FIG. 2.

The inner surface of each ear 42 contains a blind slot 43 and a small cylindrical projection 45. The base of blind slot 43 is semi-cylindrical and shaped to pivotally receive trunnion 44, extending from the sides 24 and 26 of container 16. In this way, to disconnect the container from the board member as shown in FIG. 1, the container can simply be lifted by sliding trunnions 44 up and out of the blind slots 43 for cleaning of both parts of the arrangement.

A pair of detents, or blind bore 46, are provided at space locations from the trunnion 44 on each side of the container 16. Detents 46 extend along an imaginary circle centered on trunnion 44 and at a radial position corresponding to the radial position of projection 45 on the inner surface of each ear 42. Detents 46 are positioned so that when the lower detent is engaged by the projections 44, container 16 is fixed in its use position with respect to board member 30 as shown in FIG. 2.

It is understood that the placement of the detents, the trunnions, the slots and the projections can be exchanged or reversed within the scope of the invention.

With the container 16 pivoted into its storage position, projections 45 extend into the upper detents 46 (as shown in FIG. 1) to fix the storage position shown in FIG. 3.

In the embodiment of FIGS. 1–3, board member 30 comprises a cutting or chopping board and can be made of suitable washable plastic material, such as nylon, Dacron (a trademark) or other appropriate synthetic material. Alternatively, natural material, such as wood, can be used with attachments forming the pivot means (not shown).

The upper surface 34 of board member 30, when used as a chopping or cutting board, advantageously includes a peripheral channel 35 extending slightly inwardly from the sides 37, and along the opposite side 38 of board member 30. Channel 35 ends in a pair of outlets 39 with each outlet being adjacent one of the ears 42 for discharging liquid which has moved from the top surface 34 of the board, channeling the liquid into the container 16.

A pair of rubber or other high friction feet or pads 31 are provided at the corners of the board member having at least portions extending around to the bottom 32 of the board member to engage the work surface 12 and help fix the arrangement by friction, in the use position and on the work surface. A rubber layer may be used across the bottom of board member 30 in the alternative.

As shown in FIG. 3, a stable storage position is achieved by providing at least some of the upper edge of the container 16 around the opening 18, to be in a common plane so that the arrangement lies flat and stable against the storage surface 52. To this end, at least part of the ears 42 of the pivot means 40 may have a flat surface which is co-planer with at least part of the peripheral edge of the container, again, to help stabilize the arrangement in its storage position.

In the remaining figures, the same or similar reference numerals are utilized to designate the same or functionally similar parts.

Figure 4:
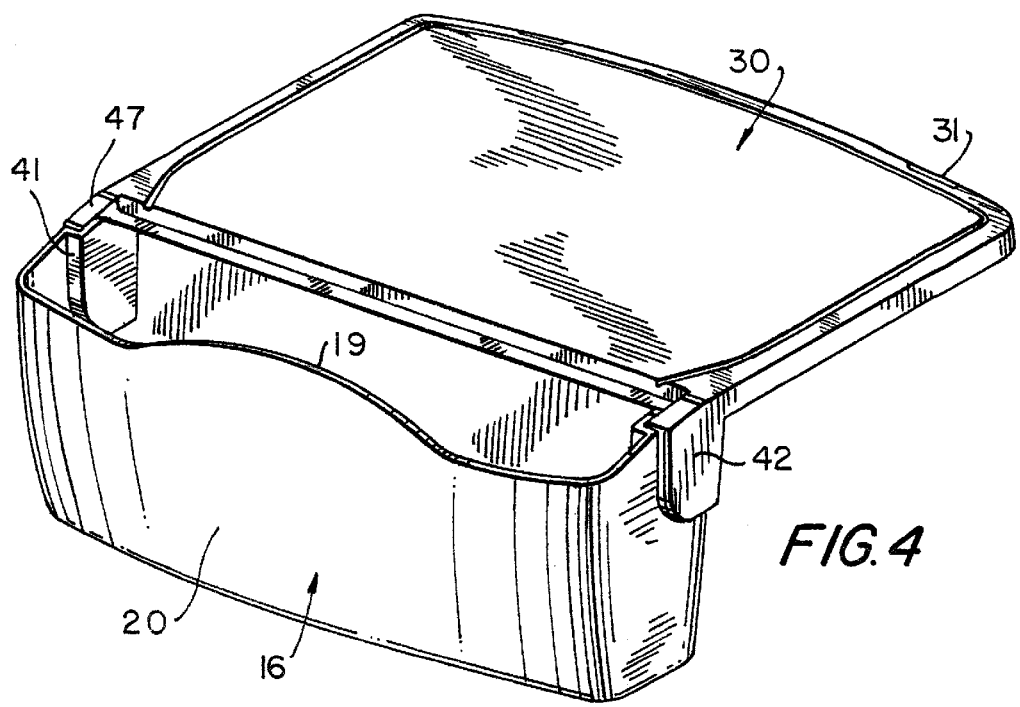
FIG. 4 is a perspective view of the second embodiment of the invention.
Figure 5:
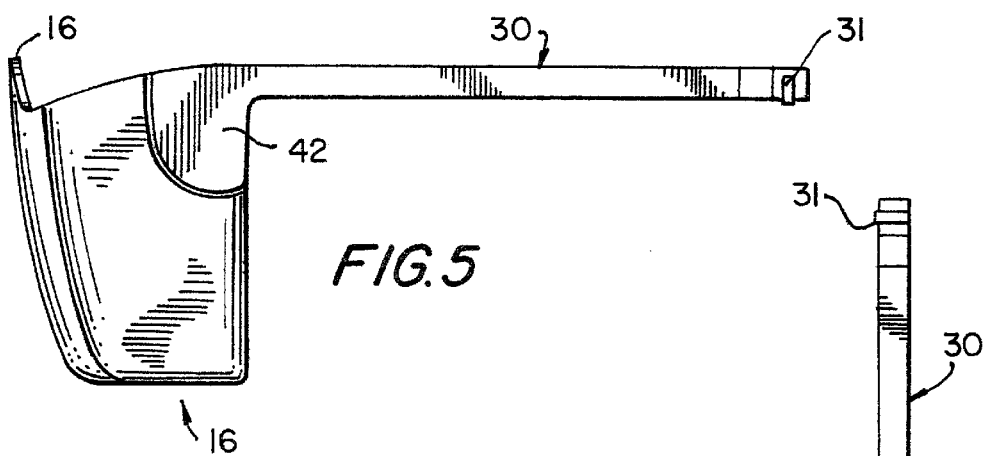
FIG. 5 is a side elevational view of the second embodiment in a used position.
Figure 6:
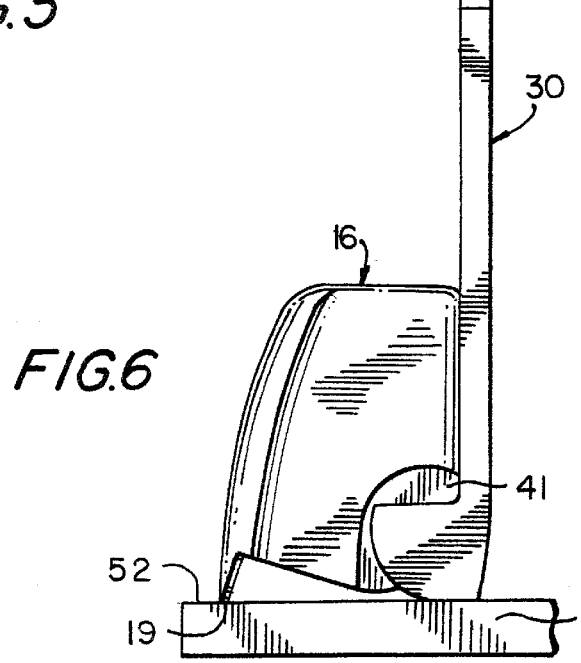
FIG. 6 is a side elevational view of the second embodiment in a storage position.

FIG. 4 illustrates a second embodiment of the invention with cutting board member 30 pivotally connected to container 16 by a pair of ears 42 which are partly recessed into alcoves 41, formed in the opposite sides of container 16. Each of the ears includes a flat platform portion 47 which, in the storage position of the arrangement shown in FIG. 6, is co-planer with at least a projecting portion 19 in the upper edge of the outer side wall 20 of container 16. This produces a stable three-point contact with the storage surface 52 in the storage position of the arrangement shown in FIG. 6. Although not shown in FIGS. 4, 5 and 6, a similar slot and trunnion arrangement for the pivot means of FIG. 1 is used in the second embodiment as well.

Also, although continuous wall containers are illustrated, it is understood that the invention can also be used with baskets or other partially opened containers, depending on the purpose of the invention. Continuous wall containers are essential, however, if liquid waste is contemplated.

Figure 7:
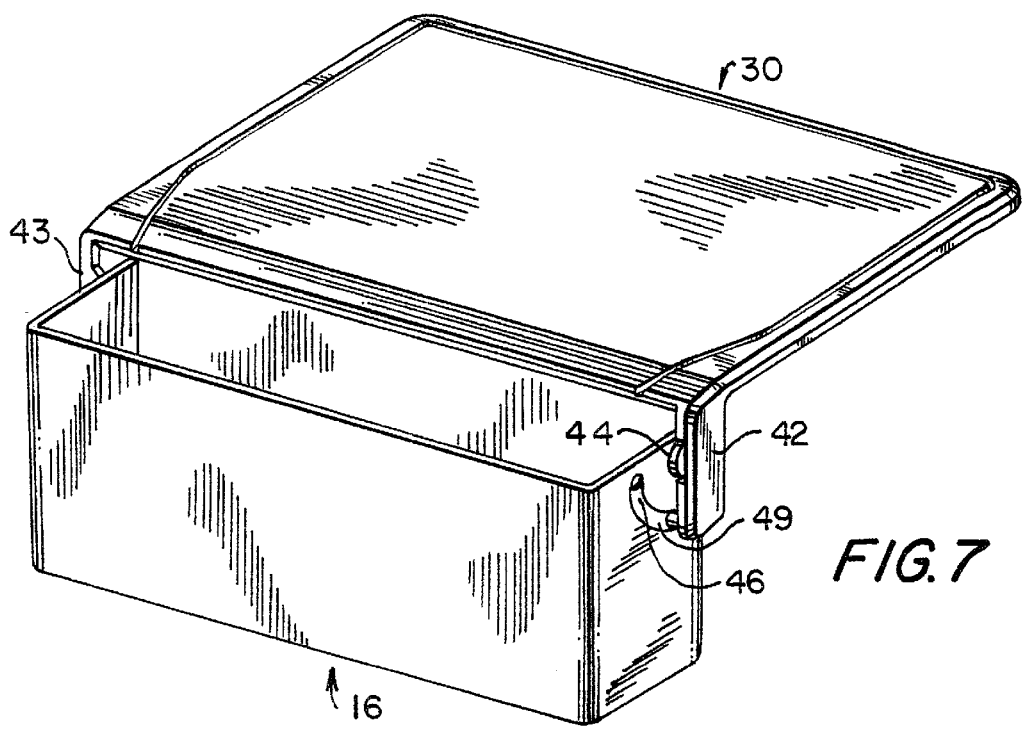
FIG. 7 is a perspective view of the third embodiment of the invention.
Figure 8:
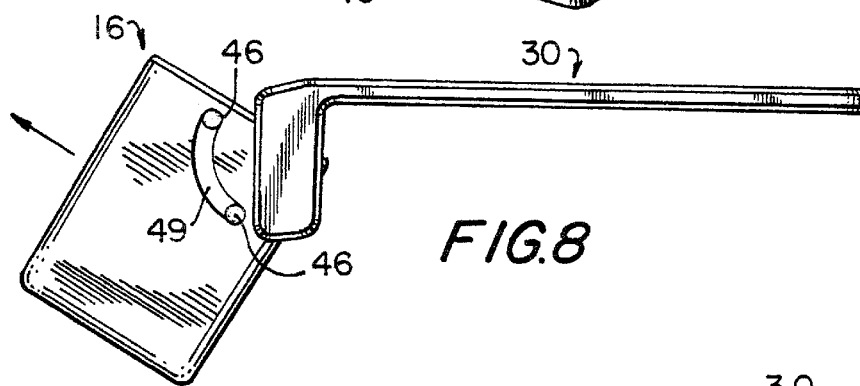
FIG. 8 is a partially disassembled side elevational view of the third embodiment.
Figure 10:
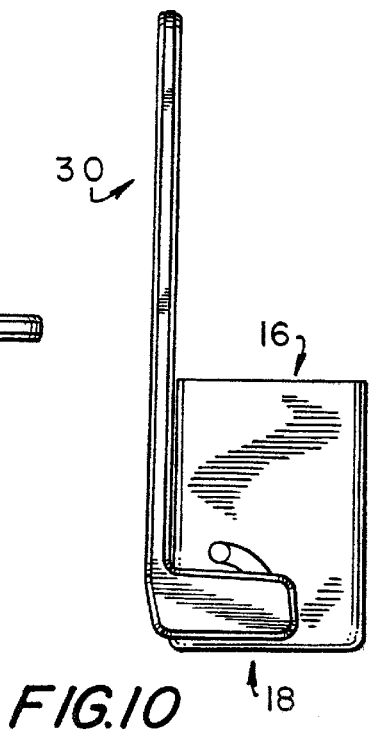
FIG. 10 is a side elevational view of the third embodiment in a storage position.

FIG. 7 illustrates a third embodiment of the invention where, again, board member 30 is a cutting or chopping board. As shown in FIG. 10, the stable storage position is achieved by having the entire upper edge around the opening 18 of container 16 co-planer so it lies flat on a storage surface.

Figure 9:
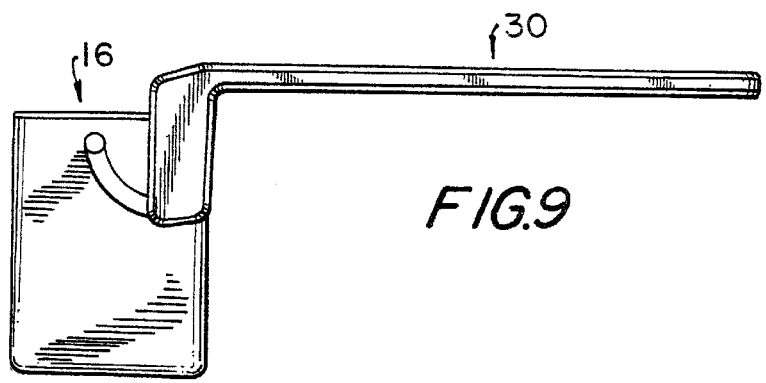
FIG. 9 is a side elevational view of the third embodiment in a used position.

The pivot means also include a pair of trunnions 44 on the side walls of container 16 which ride in a pair of grooves 43 on the inner surfaces of the ears 42, connected to the board member 30. The pair of detents 46 in the embodiment of FIG. 7 lie in the opposite ends of an arc or groove 49. In this way, the projections on the inner surfaces of ears 42 have opposite stable stop positions to establish the use position of FIG. 9 and the storage position of FIG. 10, and ride in a well defined slot 49 between these two end positions.

The projections can engage and disengage the detents by virtue of the fact that the ears 42 and/or the side walls of container 16 are made of resilient material.

Figure 11:
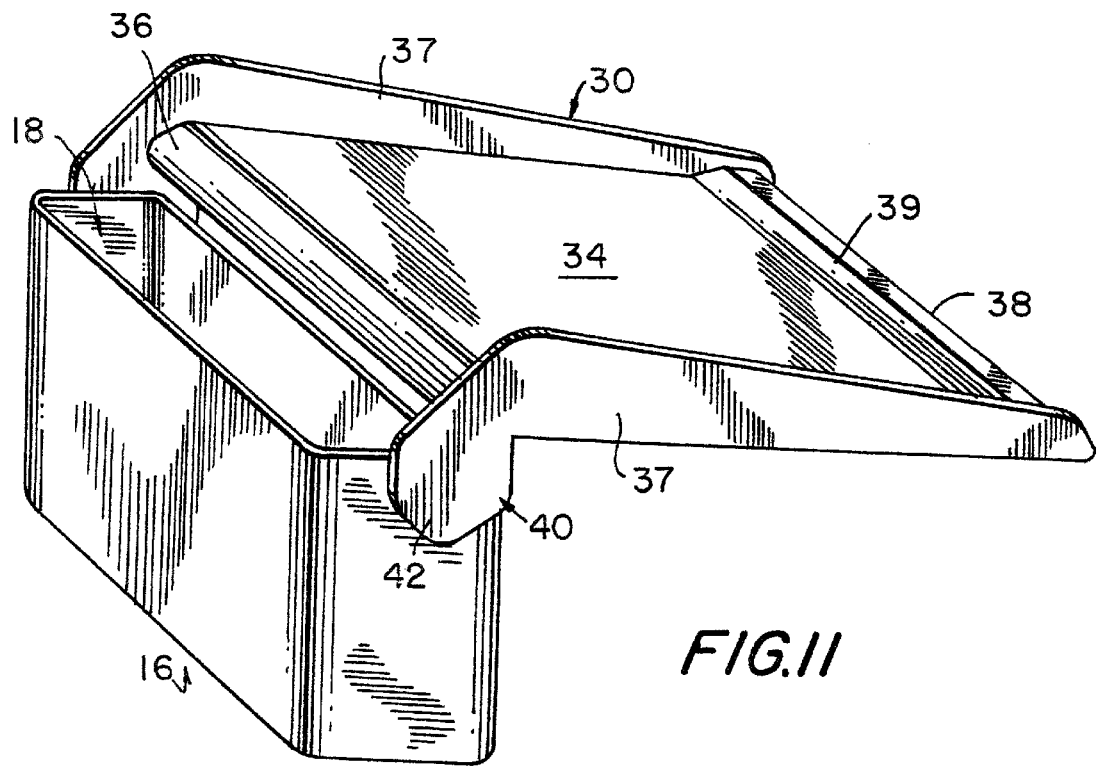
FIG. 11 is a perspective view of the fourth embodiment of the invention.

FIG. 11 illustrates a fourth embodiment of the invention where the board member 30, rather than being a cutting or chopping board, is a collection board analogous to a dust pan which has an inlet edge 38 with a raised inlet ridge 39 on the upper surface 34 of the collection board. Sidewalls 37 of board 30 are raised above the top surface 34 to help channel dust and debris which can be swept over side 38 and ridge 39, on to surface 34 and then down an inclined outlet side 36 into the open top 18 of container 16. Similar pivot means 30 to those used in FIGS. 1–10 can be used in the embodiment of FIG. 11.

The surface 34 may be inclined upwardly toward the discharge side 36 (see FIG. 12) or may be flat and parallel to the work surface.

Figure 12:
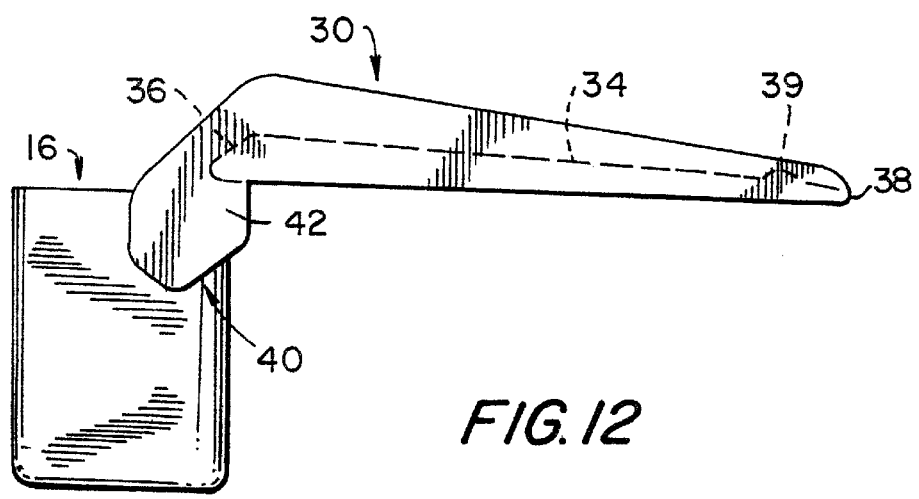
FIG. 12 is a side elevational view of the fourth embodiment in a used position.

The use position is shown in FIG. 12, and a storage position (not shown) also takes advantage of co-planer portions of the upper edge of the container and/or, sides of the ears 42, forming the pivot means 40.

A high friction sheet may be applied to the lower surface of board member 30 to keep it fixed on the work surface.

While a specific embodiment of the invention has been shown and described in detail to illustrate the application of the principles of the invention, it will be understood that the invention may be embodied otherwise without departing from such principles.

What is claimed is:

1. A board and waste container arrangement for a work surface having an edge, the arrangement comprising:

a waste container having an open top, side walls and a bottom defining a waste receptacle for placement next to the edge of a work surface in an open use position for the container;

a board member having a bottom for placement on the work surface near the edge of the work surface in a use position for the board member, the board member having a top and a discharge side, the discharge side being placed over and along the edge of the work surface when the board member is in the use position; and pivot means connected between the board member and the container for pivotally mounting the container to the board member adjacent the discharge side of the board member so that the container hangs over the edge of the work surface in the use position of the container and the board member, one side wall of the container being nearest to the discharge side of the board member and extending substantially perpendicularly to the board member with the bottom of the container being below the board member, the pivot means being at least partly below the bottom of the board member and, with the container, being structured so that the container has a closed storage position with said one side wall of the container lying along and adjacent the bottom of the board member in said storage position.

2. An arrangement according to claim 1 wherein the container includes an upper edge around the open top, the open edge having multiple co-planer portions for allowing stable support of the container and board member in the storage position and on a storage surface.

3. An arrangement according to claim 2 wherein at least part of the pivot means is co-planer with the storage surface for stabilizing the storage position of the arrangement.

4. An arrangement according to claim 3 when the pivot means include a pair of ears extending from the board member at opposite ends of the discharge side, the ears being engaged with opposite side walls of the container.

5. An arrangement according to claim 1 wherein the pivot means comprise a pair of ears extending from the board member at opposite ends from the discharge side, said ears being engaged with opposite side walls of the container for pivotally connecting the container to the board member.

6. An arrangement according to claim 5 wherein each of said ears has a portion which is co-planer with at least part of an edge of the container around the open top of the container when the container and board member are in the storage position for storage of the arrangement with the open top down and the board extending upwardly along the one side wall of the container.

7. An arrangement according to claim 5 wherein said pivot means further includes a pair of trunnions extending outwardly from the opposite sides of the container and an aperture on each ear for receiving each trunnion respectively.

8. An arrangement according to claim 7 wherein each aperture comprises a blind slot.

9. An arrangement according to claim 7 including detent means between said ears and the opposite side walls of the container for establishing said use position and said storage position.

10. An arrangement according to claim 9 wherein said detent means includes a pair of detents in the opposite sidewalls of the container and a projection on each ear for engaging a respective detent.

11. An arrangement according to claim 1 wherein said board member comprises a cutting board.

12. An arrangement according to claim 11 wherein a cutting board includes a pair of opposite sides on opposite sides of the discharge side and a further side opposite from the discharge side, the cutting board including a channel on the top of the cutting board extending along the opposite sides and the further side.

13. An arrangement according to claim 12 wherein the channel includes a pair of outlets at the discharge side for discharging liquid into the open top of the container in the use position.

14. An arrangement according to claim 11 including at least two high friction pads extending at least partly on the bottom of the board member for engaging the work surface.

* * * * *